(12) United States Patent
Buccella et al.

(10) Patent No.: US 7,496,575 B2
(45) Date of Patent: Feb. 24, 2009

(54) APPLICATION INSTRUMENTATION AND MONITORING

(75) Inventors: Donato Buccella, Watertown, MA (US); Seth N. Birnbaum, Boston, MA (US); Nicholas Stamos, Belmont, MA (US); Leonard F. Halio, Westford, MA (US); Dwayne Carson, Mendon, MA (US); Luis M. Fernandes, Berkley, MA (US)

(73) Assignee: Verdasys, Inc., Waltham, MA (US)

( * ) Notice: Subject to any disclaimer, the term of this patent is extended or adjusted under 35 U.S.C. 154(b) by 511 days.

(21) Appl. No.: 10/995,020

(22) Filed: Nov. 22, 2004

(65) Prior Publication Data

US 2006/0123101 A1    Jun. 8, 2006

(51) Int. Cl.
  *G06F 7/00* (2006.01)
  *G06F 17/30* (2006.01)
  *G06F 15/173* (2006.01)
  *G06F 9/44* (2006.01)

(52) U.S. Cl. .......................... 707/9; 709/224; 717/127

(58) Field of Classification Search ................ 709/224, 709/203; 707/102, 10, 9; 717/128, 127; 713/165, 188
  See application file for complete search history.

(56) References Cited

U.S. PATENT DOCUMENTS

| | | | | |
|---|---|---|---|---|
| 5,897,635 | A * | 4/1999 | Torres et al. | 707/10 |
| 6,118,862 | A * | 9/2000 | Dorfman et al. | 379/201.03 |
| 6,192,403 | B1 * | 2/2001 | Jong et al. | 709/224 |
| 6,678,883 | B1 * | 1/2004 | Berry et al. | 717/128 |
| 6,754,890 | B1 * | 6/2004 | Berry et al. | 717/128 |
| 6,839,896 | B2 | 1/2005 | Coffman et al. | |
| 7,100,047 | B2 * | 8/2006 | Stamos et al. | 713/165 |
| 7,281,011 | B1 * | 10/2007 | Bradley et al. | 707/100 |
| 7,281,020 | B2 | 10/2007 | Fine | |
| 2002/0002609 | A1 * | 1/2002 | Chung et al. | 709/223 |
| 2002/0118220 | A1 | 8/2002 | Lui et al. | |
| 2002/0120685 | A1 * | 8/2002 | Srivastava et al. | 709/203 |
| 2002/0161766 | A1 * | 10/2002 | Lawson et al. | 707/9 |
| 2002/0165988 | A1 | 11/2002 | Khan et al. | |

(Continued)

OTHER PUBLICATIONS

"Planning for CA-ACF2 Migration to OS/390 Security Server (RACF)," *IBM International Technical Support Organization*, Poughkeepsie, NY, 1st ed. (1996).

*Primary Examiner*—Hung T Vy
(74) *Attorney, Agent, or Firm*—Hamilton, Brook, Smith & Reynolds, P.C.

(57) ABSTRACT

A data processing application logging, recording, and reporting process and infrastructure. Compliance with regulatory directives such as HIPAA, internal organizational and corporate, personal information privacy, and other security policies can thus be enforced without the need to recode legacy application software. In one preferred embodiment, a core agent process provides "listener" functionality that captures user input events, such as keyboard and mouse interactions, between a user and a legacy application of interest. The agent obtains instructions for how to deal with such events, accessing information that describes the application's behavior as already captured by an application profiler tool. Keyboard and mouse data entry sequences, screen controls and fields of interest are tagged during application profiling process. This data is stored in application profile developed for each mode of a legacy application. The technique can be implemented in various Information Technology (IT) environments including mainframe/terminal applications and/or client/server applications. Thus, full coverage of "fat" client, "thin" client, and legacy "mainframe" applications can be provided with a common approach across an enterprise.

29 Claims, 16 Drawing Sheets

U.S. PATENT DOCUMENTS

| | | |
|---|---|---|
| 2003/0005174 A1 | 1/2003 | Coffman et al. |
| 2003/0120935 A1 * | 6/2003 | Teal et al. .................. 713/188 |
| 2003/0169306 A1 * | 9/2003 | Makipaa et al. ............. 345/864 |
| 2004/0181794 A1 * | 9/2004 | Coleman et al. ............ 718/104 |

* cited by examiner

IF GROUP=MEDICAL REVIEW ADMISTRATORS: THEN BLOCK ALL REMOVABLE MEDIA, PRINTING AND CLIPBOARD AND ONLY ALLOW NETWORK CONNECTIONS BACK TO THE HOST SERVER, REDACT CREDIT CARD AND SSN INFORMATION, EXCEPT MEDICAL REVIEW SUPERVISORS WHO MAY PRINT FORMS BUT WITH CREDIT CARD INFORMATION AND SSN REDACTED

```
<!-- In addition to rules in previous example include: -->
<!-- Redact CreditCard Field and SSN Field in form=Patient Info -->
<appProfile appName="PatientClaims.exe" >
    <!-- Credit Card -->
    <redact form="PatientInfo" fieldId="1022001" />
    <!-- SSN -->
    <redact form="PatientInfo" fieldId="1022023" />
</appProfile>
```

FIG. 7

IF GROUP= CLAIMS PROCESSING: THEN BLOCK ALL REMOVABLE MEDIA, PRINTING AND CLIPBOARD AND ONLY ALLOW NETWORK CONNECTIONS BACK TO THE HOST SERVER, EXCEPT CLAIMS PROCESSING SUPERVISORS WHO MAY PRINT FORMS

```
<!-- block writes to removable media -->
<if> <and>
    <equal property="fsOperation" intValue="fOpWrite" />
    <equal property="fsMediaType" int Value="fRemovable" />
</and>
</if>
<!-- block all printing -->
<if>
    <equal property="prtPrinterName" stringValue="" />
</if>

<!-- block all clipboard copies from customer service app -->
<if>
<or>
    <equal property="clpOperation" intValue="clpCut" />
    <equal property="clpOperation" intValue="clpCopy" />
</or>
</if>
<!-- block all network traffic except to server.company.com -->
<if>
    <equal property="netRemoteAddress" hostValue="server.company.com" />
</if>
```

FIG. 8

```
JK Accounts – zSeries – A – TCP00010                                    _ □ X
File  Edit  View  Communication  Actions  Help
[====================]

ACCOUNTS         DETAILS OF ACCOUNT NUMBER 10000

SURNAME        : DOE                  (18 CHRS)  TITLE        :            (4 CHRS  OPTIONAL)
FIRST NAME     : JANE                 (12 CHRS)  MIDDLE INIT: A           (1 CHR   OPTIONAL)
TELEPHONE      : 2129871234           (10 DIGS)
ADDRESS LINE1 : 202 2ND AVE.                    (24 CHRS)
        LINE2 : NEW YORK, NY                     (24 CHRS)
        LINE3 :                                  (24 CHRS OPTIONAL)

CARDS ISSUED   : 1          (1 TO 9)            CARD CODE    : A          (1 CHR)
DATE ISSUED    : 04 24 04   (MM DD YY)          REASON CODE: L            (N, L, S, R)
APPROVED BY    : REH        (3 CHRS)

UP TO 4 OTHERS WHO MAY CHARGE (EACH 32 CHRS  OPTIONAL)
  01:                                  02:
  03:                                  04:

SPECIAL CODE1:  CODE2:     CODE3:           (EACH 1 CHR OPTIONAL)
NO HISTORY AVAILABLE AT THIS TIME           CHARGE LIMIT   1000.00             STATUS N

NOTE: - DETAILS IN BRACKETS SHOW MAXIMUM NO. CHARACTERS ALLOWED AND IF OPTIONAL

PRESS "CLEAR" OR "ENTER" TO RETURN TO THE MENU WHEN FINISHED

◄   2serveros.dfw.ibin.com:23      03/017
```

FIG. 9

```xml
<?xml version="1.0" ?>
- <profile version="3">
    <application name="C:\ProgramFiles\InternetExplorer\IEXPLORE.EXE" title="JK Accounts - zSeries -
    - <screens type="3270">
        - <screen name="account_details' display_name="Account Details" type="DATA">
            - <discovered>
                <field id="1" type="6" name="id_1" display_name="ID #1" text="ACCOUNTS" />
                <field id="19" type="6" name="id_2" display_name="ID #2" text="DETAILS OF" />
                <field id="30" type="6" name="id_3" display_name="ID #3" text="ACCOUNT NUMBER" />
                <field id="45" type="6" name="acct_no" display_name="Account Number" text="10000" />
                <field id="176" type="6" name="LName" display_name="Last Name" text="DOE" />
                <field id="218" type="6" name="Title" display_name="Title" text="" />
                <field id="256" type="6" name="FName" display_name="First Name" text="JANE" />
                <field id="298" type="6" name="MiddleInitials" display_name="Middle Initials" text="A" />
                <field id="336" type="6" name="Telephone" display_name="Telephone" text="2129871234" />
                <field id="416" type="6" name="addr_1" display_name="Address #1" text="202 2ND AVE." />
                <field id="496" type="6" name="addr_2" display_name="Address #2" text="NEW YORK, NY" />
                <field id="576" type="6" name="addr_3" display_name="Address #3" text="" />
                <field id="736" type="6" name="NumCards" display_name="Cards Issued" text="1" />
                <field id="778" type="6" name="CardCode" display_name="Card Code" text="A" />
                <field id="816" type="6" name="issued_month" display_name="Month Issued" text="04" />
                <field id="819" type="6" name="issued_day" display_name="Day Issued" text="24" />
                <field id="922" type="6" name="issued_year" display_name="Year Issued" text="04" />
            </discovered>
            - <identify>
                <field id="1" type="6" name="id_1" display_name="ID #1" text="ACCOUNTS" />
                <field id="19" type="6" name="id_2" display_name="ID #2" text="DETAILS OF" />
                <field id="30" type="6" name="id_3" display_name="ID #3" text="ACCOUNT NUMBER" />
            </identify>
            - <selected>
                <field id="45" type="6" name="acct_no" display_name="Account Number" text="10000" />
                <field id="176" type="6" name="LName" display_name="Last Name" text="DOE" />
                <field id="218" type="6" name="Title" display_name="Title" text="" />
                <field id="256" type="6" name="FName" display_name="First Name" text="JANE" />
                <field id="298" type="6" name="MiddleInitials" display_name="Middle Initials" text="A" />
                <field id="336" type="6" name="Telephone" display_name="Telephone" text="2129871234" />
                <field id="416" type="6" name="addr_1" display_name="Address #1" text="202 2ND AVE." />
                <field id="496" type="6" name="addr_2" display_name="Address #2" text="NEW YORK, NY" />
                <field id="576" type="6" name="addr_3" display_name="Address #3" text="" />
                <field id="736" type="6" name="NumCards" display_name="Cards Issued" text="1" />
                <field id="778" type="6" name="CardCode" display_name="Card Code" text="A" />
                <field id="816" type="6" name="issued_month" display_name="Month Issued" text="04" />
                <field id="819" type="6" name="issued_day" display_name="Day Issued" text="24" />
                <field id="922" type="6" name="issued_year" display_name="Year Issued" text="04" />
```

APPLICATION ACCESS FORENSIC REPORT

VERDASYS — DIGITAL GUARDIAN

Query Options

User(s): Everyone
Start Date: 9/3/2004  3  AM  Application: Patient Records
End Date: 9/8/2004  8  PM  Computer:

[Run Report]

| Computer User | Application User | Computer | Date | Logon Result | Application |
|---|---|---|---|---|---|
| VERDASYS/RTufts | RTufts | PatientData1 | 9/3/2004 2:05:14 PM | Success | Patient Records |
| VERDASYS/RTufts | RTufts | PatientData1 | 9/4/2004 2:25:39 PM | Success | Patient Records |
| VERDASYS/RTufts | RTufts | PatientData1 | 9/5/2004 2:55:55 PM | Success | Patient Records |
| VERDASYS/RTufts | RTufts | PatientData1 | 9/6/2004 2:16:09 PM | Success | Patient Records |
| VERDASYS/RTufts | RTufts | PatientData1 | 9/7/2004 2:07:01 PM | Success | Patient Records |
| VERDASYS/RTufts | RTufts | PatientData3 | 9/8/2004 1:55:04 PM | Failure | Patient Records |
| VERDASYS/AGrimley | RTufts | PatientData3 | 9/8/2004 3:03:15 PM | Failure | Patient Records |
| VERDASYS/AGrimley | RTufts | PatientData3 | 9/8/2004 3:03:35 PM | Failure | Patient Records |
| VERDASYS/AGrimley | RTufts | PatientData3 | 9/8/2004 3:04:13 PM | Failure | Patient Records |
| VERDASYS/AGrimley | RTufts | PatientData3 | 9/8/2004 3:04:55 PM | Failure | Patient Records |
| VERDASYS/AGrimley | RTufts | PatientData3 | 9/8/2004 3:05:14 PM | Success | Patient Records |

Sidebar:
- ALERTS
- REPORTS
  - ACTIVITY
    - Summary
    - Application Use
    - File Access
    - Forensic
  - RISK
    - Trends
    - HIPPA
    - Risk Assessment
    - Application Access
    - Data Access
  - SETTINGS
    - File Types
- POLICIES
- FILTERS
- SYSTEM

FIG. 14

> VERDASYS                                           DIGITAL GUARDIAN                                  < >HIDE

APPLICATION ACCESS FORENSIC REPORT
Query Options

User(s): VERDASYS/AGrimley
Subject(s): 006-53-9987

Start Date: 9/8/2004  3  AM   Application: Patient Records
End Date:   9/8/2004  8  PM   Computer:    All Run Report

| Computer User | Application User | Computer | Date | Operation | Application | Form | Subject | |
|---|---|---|---|---|---|---|---|---|
| VERDASYS/AGrimley | RTufts | PatientData3 | 9/8/2004 3:05:14 PM | Logon(Success) | Patient Records | Login | 006-53-9987 | Details |
| VERDASYS/AGrimley | RTufts | PatientData3 | 9/8/2004 3:05:39 PM | Data Read | Patient Records | Patient Bio | 006-53-9987 | Details |
| VERDASYS/AGrimley | RTufts | PatientData3 | 9/8/2004 3:05:55 PM | Data Read | Patient Records | Patient Address | 006-53-9987 | Details |
| VERDASYS/AGrimley | RTufts | PatientData3 | 9/8/2004 3:06:09 PM | Data Read | Patient Records | Known Allergies | 006-53-9987 | Details |
| VERDASYS/AGrimley | RTufts | PatientData3 | 9/8/2004 3:07:01 PM | Data Delete | Patient Records | Known Allergies | 006-53-9987 | Details |
| VERDASYS/AGrimley | RTufts | PatientData3 | 9/8/2004 3:07:15 PM | Data Delete | Patient Records | Known Allergies | 006-53-9987 | Details |
| VERDASYS/AGrimley | RTufts | PatientData3 | 9/8/2004 3:08:45 PM | Data Insert | Patient Records | Recent Drugs | 006-53-9987 | Details |
| VERDASYS/AGrimley | RTufts | PatientData3 | 9/8/2004 3:10:07 PM | Data Read | Patient Records | Recent Drugs | 006-53-9987 | Details |
| VERDASYS/AGrimley | RTufts | PatientData3 | 9/8/2004 3:12:03 PM | Data Update | Patient Records | Recent Drugs | 006-53-9987 | Details |
| VERDASYS/AGrimley | RTufts | PatientData3 | 9/8/2004 3:12:53 PM | Data Update | Patient Records | Recent Drugs | 006-53-9987 | Details |

Records per page: 10    ⇤ ◄ 1 2 3 ► ⇥    23 records

ALERTS
REPORTS
ACTIVITY
  Summary
  Application Use
  File Access
  Forensic
RISK
  Trends
  HIPPA
  Risk Assessment
  Application Access
  Data Access
SETTINGS
  File Types
POLICIES
FILTERS
SYSTEM

FIG. 15

Data Access Details

Computer User: VERDASYS/AGrimley  Operation: Data Delete
Application User: RTufts  Application: Patient Records
Computer: PatientData3  Form: Known Allergies
Date: 9/8/2004 3:07:15  Subject: 006-53-9987

Form Data:

| Control Name | Data Value |
|---|---|
| Subject | 006-53-9987 |
| Allergy Name | Pollen |
| Family History | Yes |
| Last Reaction | 5/22/2003 |

FIG. 16

APPLICATION INSTRUMENTATION AND MONITORING

BACKGROUND OF THE INVENTION

This application relates to data processing systems and in particular to rule and/or regulation compliance for legacy data processing applications.

With the increasing use of computers in almost every business and administrative transaction, there is a corresponding need to ensure compatibility and compliance with new rules and regulations. Rules may originate internal to an organization and may relate to dealing with data processing security threats. Such rules may, for example, require particular employees to observe precautions such as password protecting access to systems that contain sensitive data such as customer credit card numbers.

However other, more stringent data compliance requirements now originate as regulations imposed by government authorities. For example, the U.S. Government has passed comprehensive legislation encompassing the interchange and protection of healthcare information, popularly known as the Health Insurance Portability and Accountability Act (HIPAA). This law is intended to protect patient health information from unauthorized disclosure. It does seem clear that initial targets of HIPAA compliance are likely to be major insurers and healthcare providers, however the severity of possible penalties and possible exposure to litigation and unfavorable press coverage makes compliance an issue even for smaller healthcare providers.

Compliance with this legislation has become a significant challenge for all healthcare organizations. The cost, time and business risks of remediation of existing software applications are prohibitively expensive and risky in many instances. For example, many healthcare software applications still run on main frame type systems that were originally coded more than 20 years ago. Given the uncertainties of enforcement versus the certainty of breaking legacy applications by attempting to rewrite them, some healthcare providers are choosing not to comply whatsoever.

Several other regulations and also internal company auditing standards require similar low level user application monitoring. For example, government agencies often require their contractors to have functionality in place to comply with security, auditing, and reporting standards such as NISPOM, DISKID, TEMPEST and the like. Privacy regulations such as the GLBA or even the California Privacy Act require similar visibility into specific uses of applications. Some organizations are also beginning to implement internal systems for compliance with security procedures that need to be audited at a very low level.

SUMMARY OF THE INVENTION

The present invention is an application logging, recording, and reporting infrastructure which avoids the need to recode application software including legacy applications. The invention provides a cost effective approach to remediation of legacy applications. It can be used, for example, to provide:
  compliance with regulatory directives such as HIPAA;
  corporate compliance with personal information privacy and security policies;
  centralized application usage, monitoring, and control;
  automated auditing and reporting of events;
  record investigative forensics with evidentiary quality logging; and
  training and awareness of corporate security policies.

In accordance with one preferred embodiment of the invention, a core agent process is implemented to provide "listener" functionality that captures low-level, user input events, such as keyboard and mouse interactions, between the user and a legacy application of interest.

The agent obtains instructions for how to deal with such low-level events by accessing information that describes the application as already captured by an application profiler tool. The application profiler tool records the actions of a trained user running the application through various modes of interest. Low-level events such as keyboard and mouse data entry sequences, screen controls, and manipulation of data fields of interest and the like are then tagged during application profiling process. This data is stored in an application profile developed for each mode of a legacy application.

The agent process then refers to this application profile when monitoring, recording, and controlling user interactions with the legacy application.

The invention can be implemented in various Information Technology (IT) environments including mainframe/terminal applications and/or client/server applications. Thus, full coverage of "fat" client, "thin" client, and legacy "mainframe" applications can be provided with a common approach as suggested by the invention.

As one example, consider how the invention can be applied to ensure compliance with HIPAA regulations. One essential part of such compliance involves monitoring user activity within all software applications that access patient data of any kind. Specifically, there is a need to record, to a central location, certain application-level actions such as successful and unsuccessful authentications (log-ins) to the applications, and things such as the addition, update, and deletion of data records. Compliance may even optionally require the need to hide data elements at the application level on a per authorized user basis.

Companies that deal with patient information may use several software applications developed using multiple different platforms and technologies. The invention avoids the need to modify the original program logic that implements the authentication and/or data update functionality instrumented within the original source code.

The better and more cost effective approach of the present invention is to use an agent process for monitoring each application for events shared in the respective application profile(s). The required information is noted and logged to a central server or mainframe. The agent processes thus provide constant, real time, low-level visibility into every running application without the need to modify existing application code. The server associated with the agent process provides an enterprise wide application logging functionality, which records the application-level actions that companies need in order to comply with regulations such as HIPAA. By recording application-level actions, further work in deciphering low-level users events is not necessary.

A further application area for this functionality is the ability to provision or control specific functions of a user application depending upon the identity of the user. This capability enables the agent process to control user provisioning from applications that are allowed to that user to work functionality inside the application is enable for that user.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is an example of a rule for HIPAA compliance.

FIG. 8 is another example of such a rule.

FIG. 9 is a screen shot of an IBM3270 financial application.

FIG. 10 is a profile file for the screen of FIG. 9.

FIGS. 11 and 12 are examples of using the application profiler to characterize a fat client application.

FIG. 14 is an example of an application access report.

FIG. 15 is an example of a data access report.

FIG. 16 illustrates form vector field values.

DETAILED DESCRIPTION OF THE INVENTION

A description of preferred embodiments of the invention follows.

A. System Overview

Figure 1:
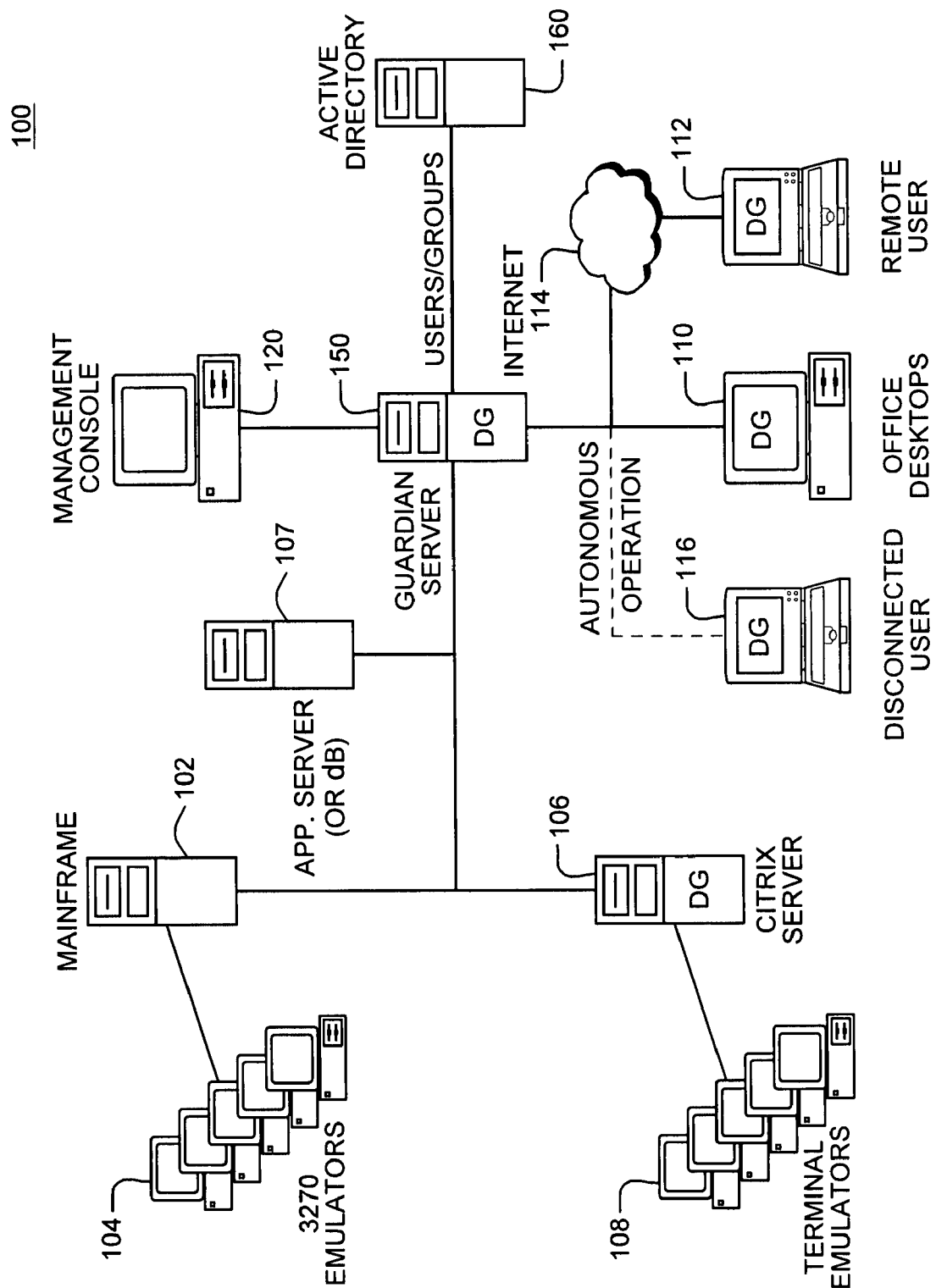
FIG. 1 is a diagram illustrating a typical Information Technology (IT) system environment in which the invention can be implemented.

Although the invention can be implemented in just about any enterprise data processing environment, FIG. 1 is a diagram of one typical environment 100. Certain legacy software applications may used a mainframe 102 as a host computer, accessed through terminal emulators such as an IBM 3270 terminal or X-Windows terminal emulators 104. Other legacy applications may run as networked applications in a Citrix™ server 106 environment. These users may access the application server(s) 106 using thin client terminal emulators 108. Still other users may run fat client-server applications, accessing networked back end databases and/or middle-tier application server(s) 107 via networked personal computers (PCs) 110. The PCs 110 may include remote users connected through networks such as the internet 114 or even disconnected users 116 operating autonomously, such as on laptop computers.

Also part of the system is a management console 120 and guardian server 150. The guardian server 150 may have access to user and group information via, for example, an active directory process 160.

Figure 2:
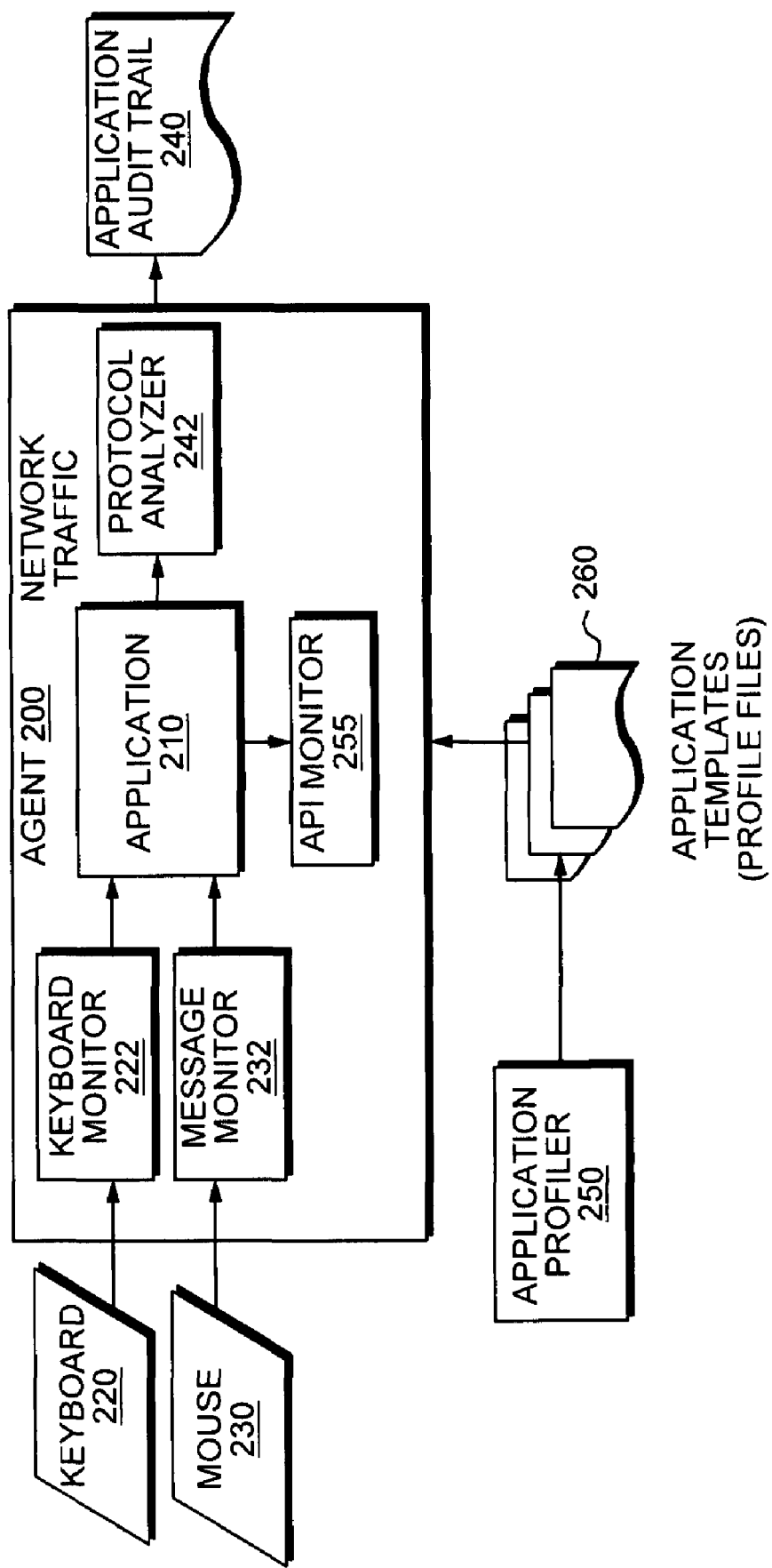
FIG. 2 illustrates how an agent employed at the application can be used to sense keyboard and other events and it's interruption with application profiles generated by an application profiler.

Regardless of the particular implementation of the applications in the enterprise, the essential concept of the present invention is to provide an agent process 200 that instruments the application 210 via an application profiling process to produce application profiles that describe the behavior of the application. The agent process 200 characterizes user activity as it occurs at the point of use, such as at the desktop or file server. In particular, as shown in FIG. 2, a guardian agent process 200 runs on the clients 110, 112, 116, as part of the server 106 or 107, or as a concurrent application running on the mainframe 102. The agent process 200 provides a mechanism for intercepting the behavior of an application 210, such as low-level user input events, and taking appropriate actions in response thereto. The agent process 200 runs as a process separate from the application 210.

In general, activities of the application 210 are monitored by the agent 200 through low-level input/output functions such as a keyboard monitor 222, message monitor 232 or protocol analyzer 242. The monitor functions permit analyzing the behavior of inputs from user devices such as a keyboard 220 or mouse 230, as well as analyzing output message generated by the application 210 such as by network protocol analyzer 242. The accountability model can also require the agent 200 to monitor user access to devices which, for example, are used for writing files to uncontrolled media such as CD-ROMs, PDAs, USB ports, wireless devices, digital video recorders or even printing of files through API.

The agent process 200 will now be described in more detail. The agent process 200 is interposed between an operating system and an application as they run on clients 102 and/or servers 104 within the network. The agent 200 reports information as application-level actions to an activity journaling and/or application audit trail database 240. Specific types and/or sequences of low-level events that lead to an application-level report being supplied to the application audit trail are defined by application profile files 260 (also referred to herein sometimes as the templates).

It should be appreciated here that the particular application-level actions to be reported depend upon the specific application and the types of event to be monitored as specified by the application profiles 260.

The guardian server 150 is responsible for management of the various agent processes 200 and application profiles 260. For example, to completely protect an enterprise, agent processes 200 would reside on all desktops 110, remote user 112 and file servers 107, application servers 106, and/or associated with an enterprise data processing system. Thus, one of the functions of guardian server 150 is to ensure that agent processes are correctly installed and not defeated. The guardian server 150 communicates with the agent process 200 through secure networking based application such as Microsoft's .NET infrastructure or other secure networking systems.

The agent process 200 may typically reside as a kernel process in a client operating system, autonomous from any application 210. For example, the agent may run within the kernel of Microsoft Windows or WindowsXP. Autonomous operation of the agent process provides for a detection of low-level events such as keyboard events or message events. The agent process 200 is also hid from a task manager or similar processes in the operating system and preferably works with safe mode boot features in order to guarantee full protection.

Communication between the agent process 200 and application audit server 240 cam also take place over an encrypted communication channel such as a Hypertext Transfer Protocol Secure (HTTPS) channel, by using the public key infrastructure (RSA/PKI) or other semantic encryption techniques.

A management console 120 permits access to the database of application profiles 260 and is used to specifically provide further information as to how develop application profiles 260.

The guardian server 150 is thus typically responsible for storing and managing application profiles 260, assigning applications to be monitored to specific users and machines (104,108,106,107,110,112,116), distribute appropriate application profiles 260 to the assigned machines, and receive, store and display audited information returned from the agent processes 200.

Before an agent process 200 can carry out its intended tasks, an application profiler process 250 is run by an administrative user to profile the application 210 and to generate application profiles 260 in response thereto. In particular, each application 210 can be considered to be a collection of screens or forms having fields into which the users input information and/or take other actions. This low-level event information is stored in one or more application profiles 260.

The application profiles 260 are used by the agent 200 to deduce the application-level actions being taken by the user while the user is running the application. The system 100 thus views an application 210 as one or more application-level actions that each comprise a collection of screens or forms that have defined low-level events, such as inputs to perform data actions regardless of the underlining technology used. Forms have unique names and have identifiable fields that need to be captured or protected. Low-level event inputs can be keystrokes sequences, menu selections or buttons that can be clicked on and result in a user action. These events can be detected at the keyboard monitor 222 or message monitor 232 or protocol analyzer 242. In other words, for some applications, key strokes are readily detected by an agent process running in the same client as the application. However, in mainframe applications, it is necessary to profile network traffic via a protocol analyzer 242 so that events such as viewing, modifying or deleting data actions can be detected, since agent processes cannot run on "dumb" terminals. In this instance the network traffic patterns are considered the low-level events stored as part of the application profile 260.

These low-level inputs are collected and interpreted as a whole to deduce application-level actions. Examples of application-level "data" actions might include data updates, data views and data deletion. These application-level actions are then collected and logged as part of the process.

The application profiler 250 thus identifies forms that are important to the particular execution stages of the applications to be monitored. For example, a typical hospital data processing system environment many forms of many different types. One class of forms of interest are those which contain patient identification information, for example.

As one example, for HIPAA compliance, the application profiler 250 may be instructed to capture a login event, whether it was successful or not, and a logoff time. The application profiler 250 would also typically be given a set of rules to apply to further actions during a user session, such as to be applied to control and/or log user events such as "view", "modify", "add" or "delete" patient data records.

There is a special case or special form in some applications that require authentication. For this particular form the application profile 260 may also collect pattern information to be able to detect successful or unsuccessful application-level actions such as a logon attempt and the username(s) used.

The profiler tool 250 can thus be thought of as a smart macro recorder that allows the administrative user to define the auditable forms, the fields that need to be protected or captured, or even hidden from view, and all the data collection parameters needed by the agent 200 to perform the desired auditing and/or control over such forms.

For example, for HIPAA compliance, it is not sufficient merely to detect the type of action—the system must also store the application-level data that was added or deleted. So the profiles 260 also store information to instruct the agent 200 which fields will be saved. In other words, the profiler 250 can also be used to specify which fields must be saved when a predetermined application-level action is detected by the agent 200. In the example being discussed for HIPAA, one may also want to capture social security numbers and medical billing codes associated with an "add" "delete" or "modify" patient record event at the application level.

The agent 200 typically also uses the profiles 260 to not only identify application-level actions when they occur, but also to capture other data about them in context, such as by logging them to application audit trail database 240.

B. Simple Examples of Application Profiles

Figure 3:
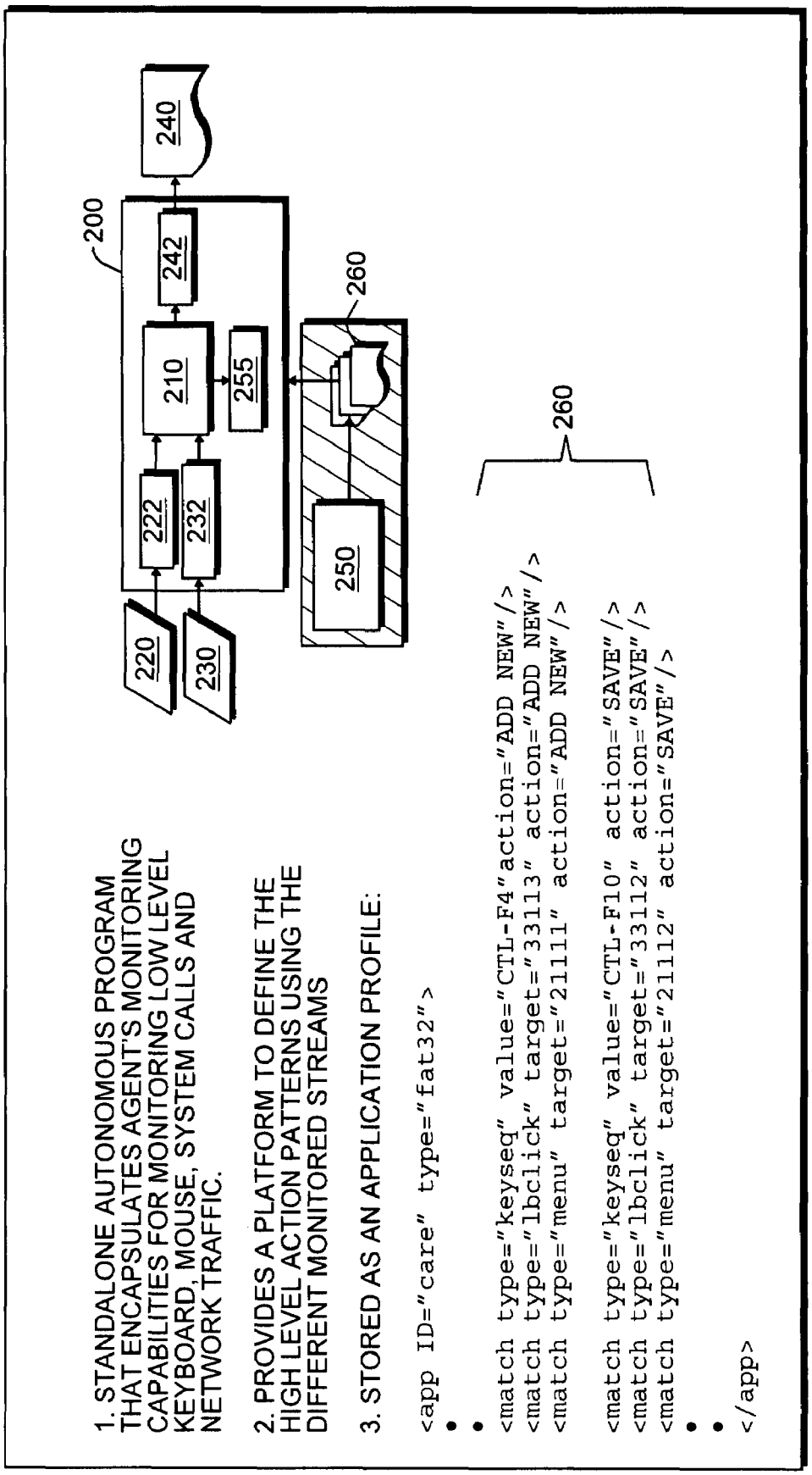
FIG. 3 is a more detailed explanation of the application profiler.

More detailed examples of how the application profiler 250 is used to generate application profiles (templates) 260, and in turn how such application profiles 260 are used by the agent processes, are now discussed. With reference first to FIG. 3, the application profiler 250 is a stand alone program that encapsulates an agent's 200 monitoring capabilities. For example, the application profiler 250 may encapsulate low-level user events such as keyboard, mouse, messages, system calls to an API monitor 255, and/or a network traffic through a protocol analyzer 242. The application profiler 250 provides a platform to define application-level actions as identified patterns of low-level events, using these different monitored input streams.

A collection of application-level action patterns for an application 210 are then stored in an application profile 260, along with rules to be applied when an application level event is detected.

A simple application profile 260 is shown at the bottom of FIG. 3—this particular profile is defined in eXtensible Markup Language (XML). Here the application name {appid} is "CARE" with a type indicated as "FAT32". The application is thus identified as a client server application, with the executing software installed on the client.

The remaining entries in the profile 260 are type definitions associated with keyboard and mouse events. For example, a first entry determines that when a low-level keyboard event, i.e., CTRL-F4 occurs, an application-level action identified as "ADD NEW" is being carried out by the application (e.g., this application-level action adds a new record to the patient database).

Additional entries in the profile 260 are associated with other input actions by which a user can add new records. For example, "target=33113" is an object identifier reported by the application as a button or a field event. This may, for example, be reported when the user a left button click "lbclick".

A third way to add a new record is to select the option via a menu item. This action is identified as "target=32111" by the application.

Similar definitions can be provided for other application-level actions. For example, a record save operation "SAVE" can by triggered by the user as either a keyboard sequence of CTRL-F10 a left button click in a particular menu context.

Once profiled in this way the agent 200 can then use the keyboard and mouse monitors to "spy" on system calls to the user interface to determine when low-level events specified by the profile have occurred.

It should be understood that there are other types of applications where one must consider message traffic, for example, through the protocol analyzer 242, rather than keyboard or mouse events. These are more likely to be used, for example, in mainframe or thin client applications where agent process can not run on a remote client.

Figure 4:
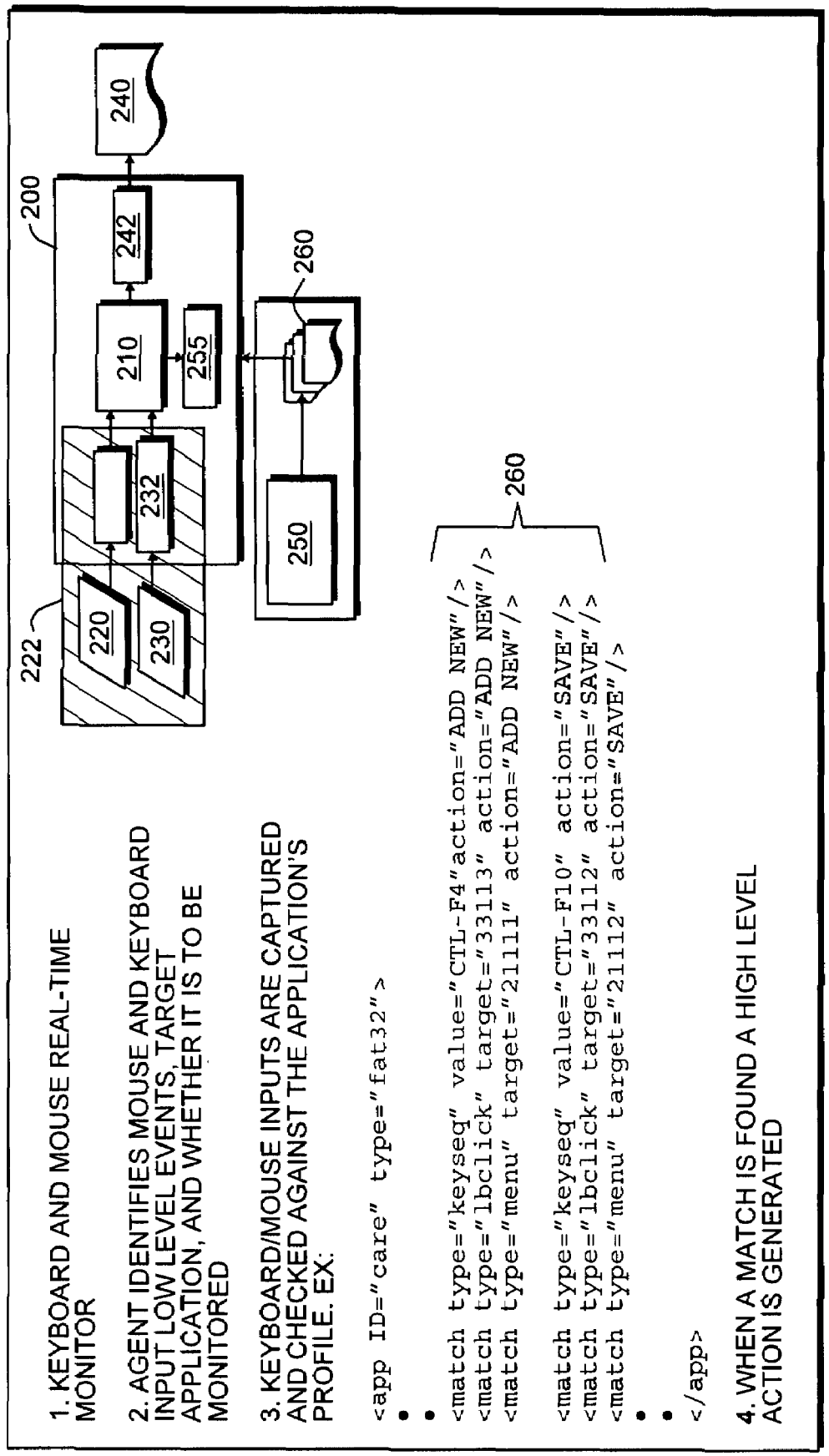
FIG. 4 is an example of the application control architecture, and an input device profile.

FIG. 4 is an example of how the profile defined in FIG. 3 is used to monitor a running application. The keyboard monitor 222 and message monitor 232 operate in real time to detect low-level events. When such events occur the agent process 200 identifies mouse and keyboard inputs in the target application, and whether or not they comprise a higher level action to be monitored. Keyboard and mouse inputs are then captured and checked against the applications specific profile. Thus, a mouse event such as the control key sequence CTRL-F10 will be flagged by the agent process 200 as a matching a high level action.

Figure 5:
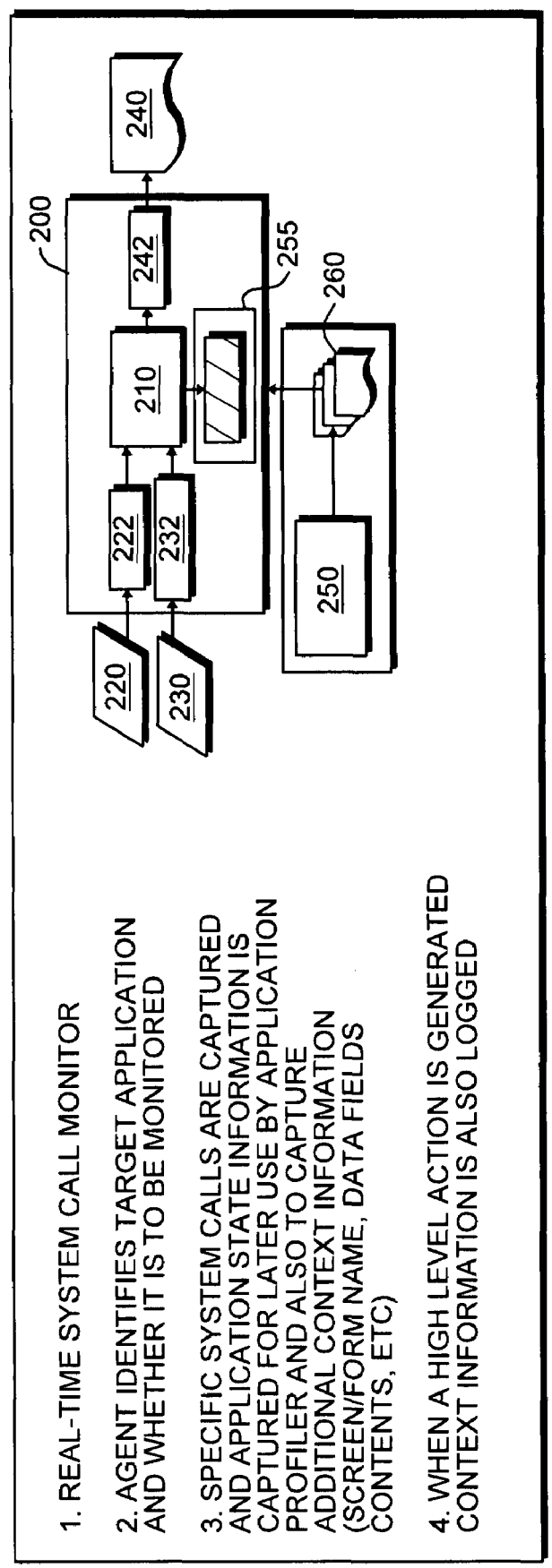
FIG. 5 illustrates an Application Programming Interface (APT) monitor.

FIG. 5 is an example of an Application Programming Interface (API) Monitor that can be used with the invention. The API Monitor is used to detect real time system calls so that the agent process can identify target applications and whether or not they are to be monitored. Specific system calls, as specified by profiles 260, are captured and application state information is saved for later use. This approach can also be used to capture additional context information such as screen/form name, data field contents and the like. When a high level event for the action is generated the context information is logged along with the event identifier to the application audit trail 240.

Figure 6:
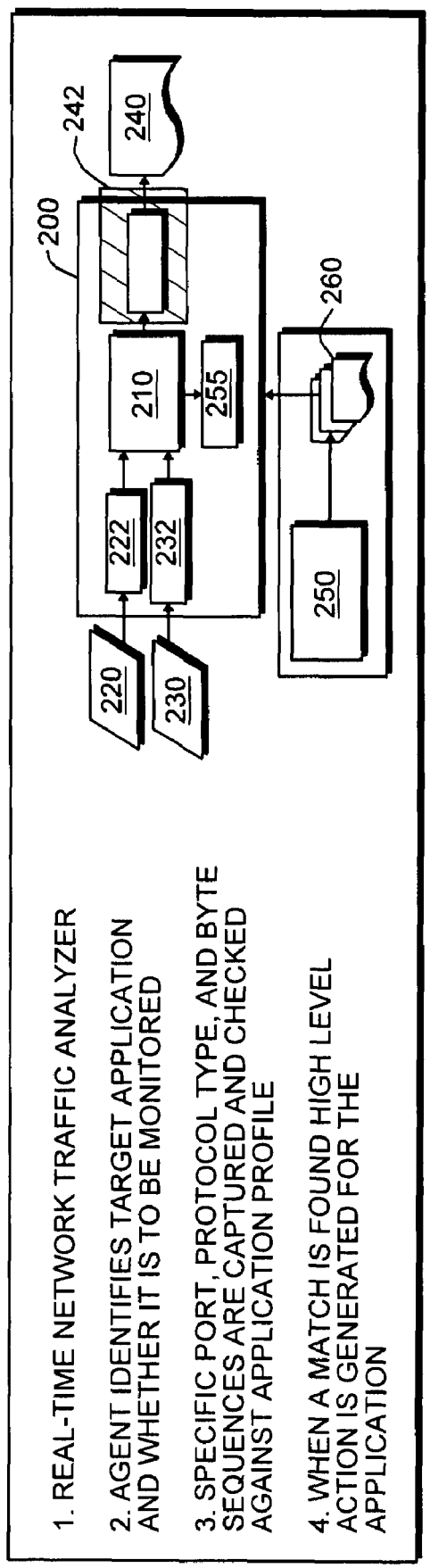
FIG. 6 illustrates that a network protocol analyzer may also be used to implement portions of the invention.

FIG. 6 is an example of a real-time network traffic analyzer where the agent process 200 can identify a target application and whether it is to be monitored. A specific network port number, protocol type and byte sequences can be captured and checked against application specific profiles. When a match is found a high level action is generated for the application. This approach is used for mainframe or thin client applications where an agent process 200 is not able to run on a client machine.

C. Implementing a Simple HIPAA Rule

Consider now a more detailed example of rules for HIPAA compliance. This example applies rules to a user group identified as "medical review administrators". The rules are to
(1) block all removable storage media events
(2) block all operating system "clipboard" events (e.g., "cut" and "paste")
(3) allow only network connections back to a specific host server
(4) redact credit card and social security information in application-level actions, except do not apply this rule to medical review supervisors, who may print forms but with credit card information and SSN redacted.

The example XML profile 260 shown in FIG. 7 can be used to implement the redaction rule (4), for example. The application is named "patientclaims.exe" and an instruction is given to redact credit card field and social security field information when the form is a patient information form.

A further example, shown in FIG. 8, allows for blocking writes to removable media, such as specified by rule (1). This profile specifies that when a event property is an operation "write" and a media type is "removable", then steps will be taken to prevent the application from accessing system calls necessary to implement the requested action.

D. Profiling a Legacy Mainframe Financial Application

FIGS. 9 and 10 are a view of a screen taken from an IBM3270 application and the corresponding application profile, created after a user data entry session. The screen in FIG. 9 is typical of what might be a legacy mainframe application used by personnel in the credit card department of a large. The corresponding profile in FIG. 10 has several sections of interest. First, an application name "JK Accounts—z Series A—TCP00002" is identified. A screen name "account_details" is assigned, of type "DATA".

This is followed by a number of entries that identify fields by type, name, and their content. Entries are further arranged into groups—here defined as "Discovered", "Identify", and "Selected".

"Discovered" fields are those fields which the application profiler was able to automatically identify. In the IBM3270 environment, this can be relatively easy since the protocols used to communicate between the mainframe and the terminal (e.g., SMA) is a very specific protocol that identifies screens, field names, and data types. In this instance, the application profiler was able to automatically identify a number of areas of the screen by simply reading the messages sent from the mainframe. It should be understood that in other environments using other protocols, the application profiler may or may not be able to identify fields automatically (notably, this would probably be more difficult with more free form protocols such as HyperText Transfer Protocol (HTTP)).

"Selected" fields are fields that the administrative user had to select manually, during the profiling process.

The "Identity" fields are fields that the administrative user had set during the profiling process. These fields were considered to be the minimum amount of information to identify the present stat of the system. Typically, such Identity fields would be captured and stored for logged events. For example, in a patient enrollment application, the Identity fields might be a patient name and Social Security Number (SSN) or plan membership ID number, etc.

Target fields—although not present in this example—can be further used to identify to whom the particular information belongs.

E. Detailed Example of Profiling a Fat Client Application 1.1.1 Application Profiler and Application Templates The profiler 250 is a standalone application that creates application profiles 260. The profiler allows the user to specify the auditable forms, the fields that need to be captured, and all the data collection parameters needed by the agent to perform the desired auditing. This application is intelligent and automated as possible, requiring little to no user interaction. The user only needs to identify form content identifiers, target identifiers and user interface inputs that identify data actions.

The profiler tool generates an application profile file 260 that contains application identification along with the profile data. The application profile 260 is then uploaded to the guardian server 150 for distribution to the various machines in the, environment 100 that require them.

1.1.2 Profiling an Application

Figure 11:
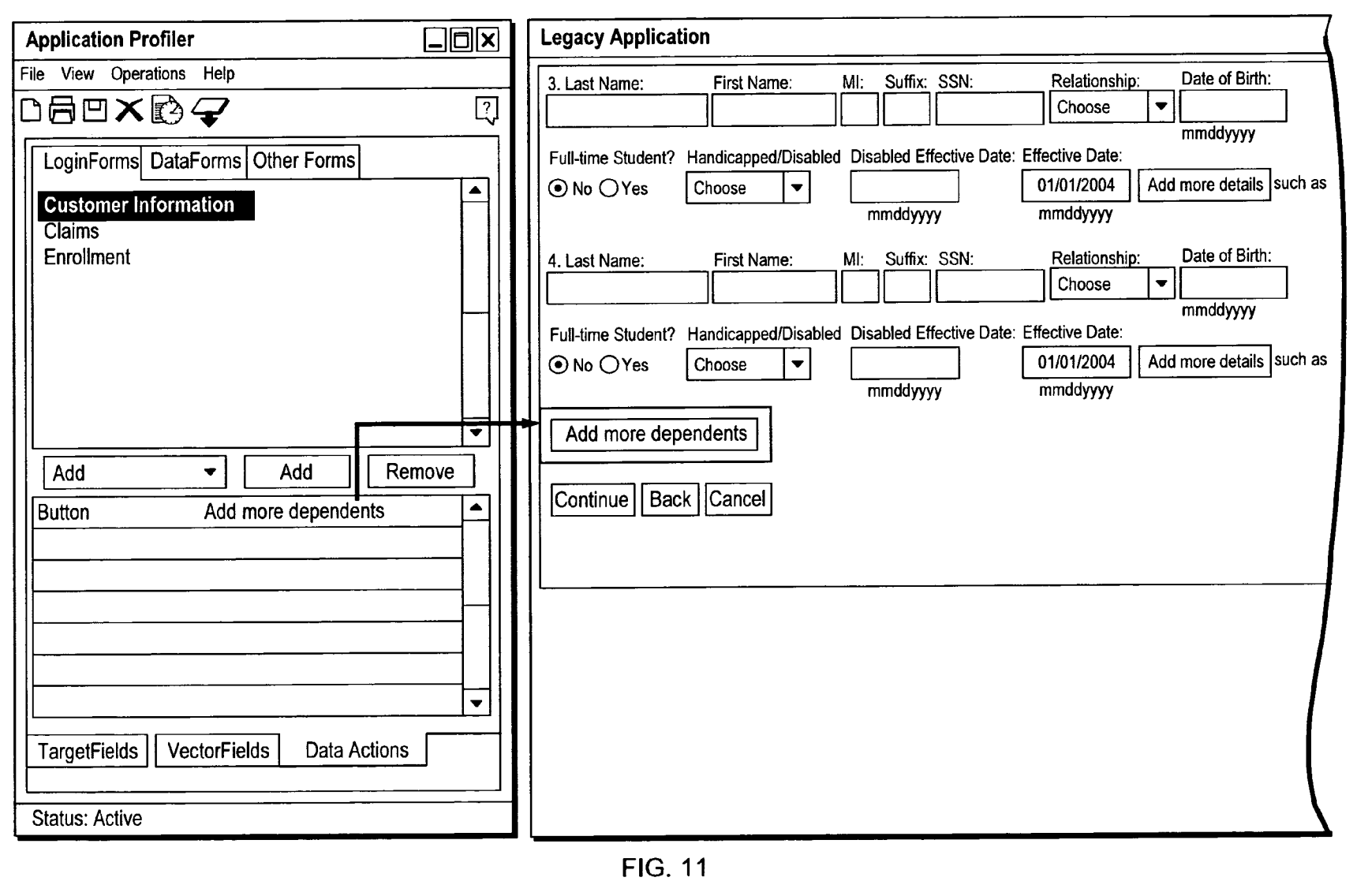

FIG. 11 is a screen shot showing a profiler 250 in action. In this embodiment, the user interface consists of two panes. The top pane contains the profiled Forms page control that has three tabbed pages. The bottom pane contains profiling details for each form types selected in the top pane. The bottom pane is context sensitive and changes depending on the type of form selected. For example, when the "Other Forms" tab is selected, the bottom pane is made blank.

Several page controls, including a Login Forms, Data Forms, and Other Forms, are listed in the profiler pane in FIG. 11. The Data Forms page is active at this point, and the administrative user is describing the behavior to be associated with the "Add more dependents" button in the one of the Data Forms.

1.1.2.1 Toolbar Buttons

Toolbar buttons (accessible through drop down menus from the File View Operations tabs, not shown in the view of FIG. 11) include:
1. Create a new profile
2. Print profile summary sheet
3. Save current profile to disk
4. Remove Form
5. Select Application
6. Add Form

1.1.2.2 Forms Page Control

The Login Forms page contains a list of all the forms or dialogs that the application displays to authenticate users. The Data Forms page contains the forms from the application that we want to collect information for. The last page, Other Forms, contains a list of forms that are used for detecting form transitions.

1.1.2.3 Data Form Bottom Pane

Figure 12:
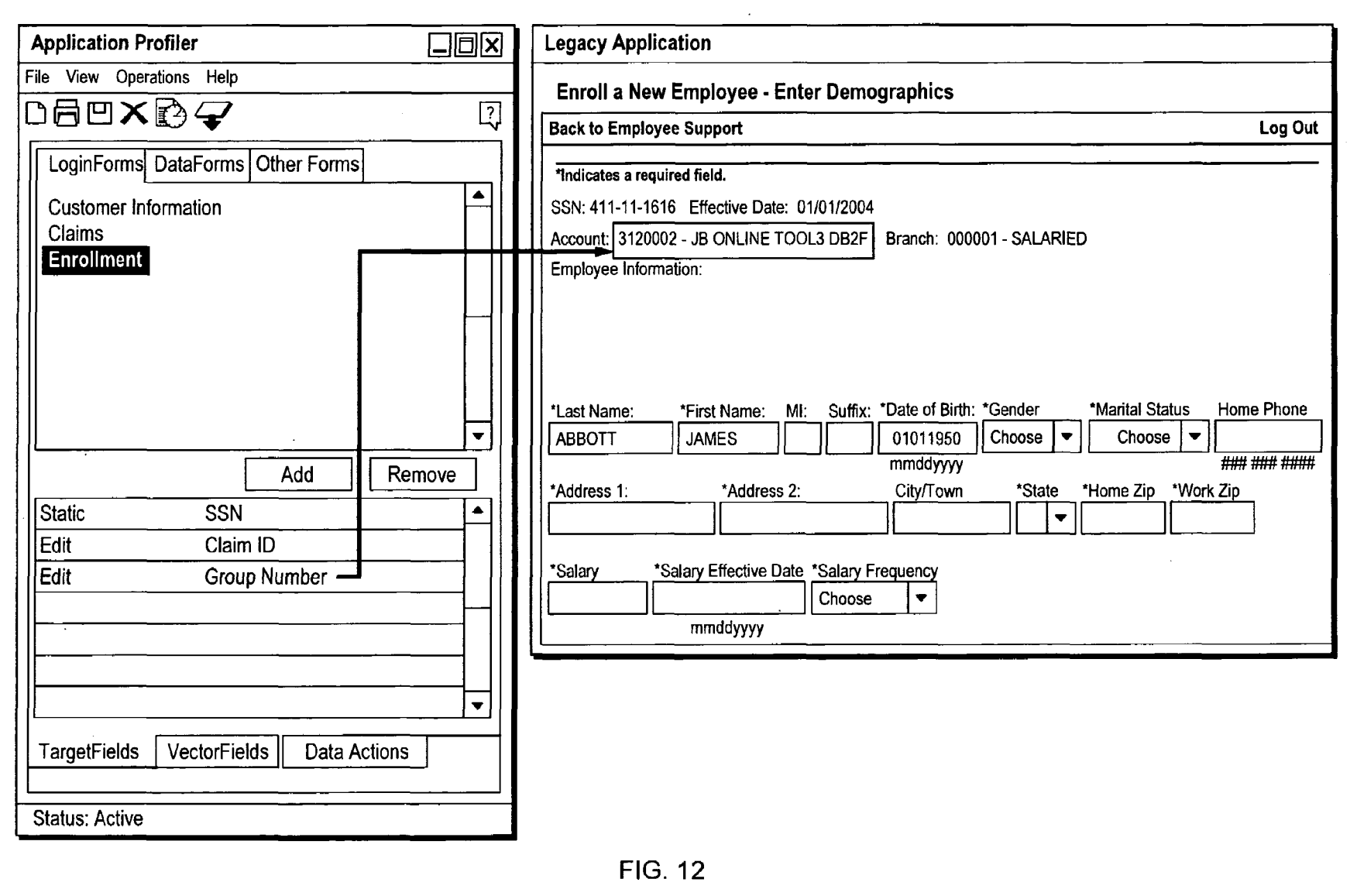

When profiling data forms the pane contains a page control with three tabs. The Data Action tab contains a "combo box" that lists the Data Actions and a list box containing user input events (button presses, key combinations and menu picks) that triggers the data action selected in the combo box. There is also an Add button that initiates the capture of the user input that triggers the action. Once user input is performed in the application, the profiler 250 adds the user input into the list box. There is also a Remove button to remove items from the list box (see FIG. 12). The Target Field and Vector Field pages contain a list box of all controls that hold information that will be collected as either the Form Vector or the Form Target. The page also contains an Add and a Remove button.

1.1.2.4 Login Form Bottom Pane

Figure 13:
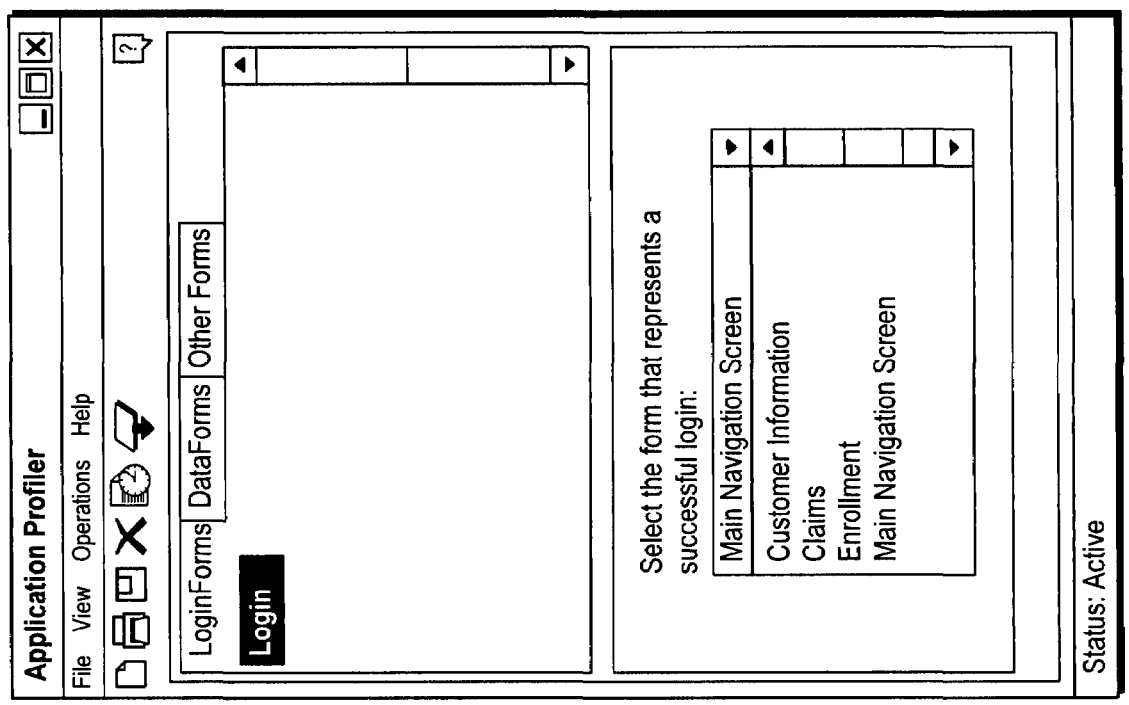
FIG. 13 illustrates the profile process for a login screen in the same application.

If the Login Forms is selected in the top pane the bottom pane displays a list box of all forms either in the Data Form or Other Forms tabbed page. The form selected must be the one that the application transitions to from the login form after a successful login (see FIG. 13).

1.1.2.5 Profiling Step by Step

An example procedure for profiling a form will now be described. A user would typically perform the following steps, in the order indicated.
1. Start Application Profiler 250
2. Start application to be profiled
3. Click "New Profile" (first button in toolbar). Click the "Select applications" button (5th button in toolbar) or the menu pick from the Operations menu and select application to be profiled from the list or running applications. After identifying the application, the profiler's 250 main interface is displayed.
4. To profile a Login Form: Go to the application and perform the necessary action to have the application show the desired Login Form. In the profiler, select the Login Forms tabbed page and press the "Add Form" button (6th in the toolbar). This will initiate the capture. Click in the caption or the inside of the Login Form. Select in the bottom pane the form that the login form transitions to on login success.
5. To profile a Data Form: Go to the application and perform the necessary action to have the application show the desired Data Form. In the profiler, select the Login Forms tabbed page and press the "Add Form" button (6th in the toolbar). This will initiate the capture. Click in the caption or the inside of the desired Data Form.
6. To profile a Data Action: Go to the application and perform the necessary action to have the application show the desired Data Form. Select the "Data Forms" tabbed page. Select the desired Data Form from the list. In the bottom pane select the Data Actions page and the desired Data Action in the action combo box. To add a user input for the selected action press the Add button to initiate the capture. The controls in the Application will be highlighted with a red box when the mouse hovers over them. Perform the user input in the application (select a highlighted control or press a key combination). The user input will be associated with the selected action.
7. To profile a Target or Vector field: Go to the application and perform the necessary action to have the application show the desired Data Form. Select the "Data Forms" tabbed page. Select the desired Data Form from the list. In the bottom pane select the Target or Vector Fields page. To add a control that contains data that needs to be collected for the selected purpose press the Add button to initiate the capture. The controls in the Application will be highlighted with a red box when the mouse hovers over them. Perform the user input in the Application. The data contained in the selected control will be collected for data actions.

2.2 Server Application Instrumentation Add-On

In addition to profiling features, the guardian server is also responsible for the storing of the application logging information collected by the agent 200, and the creation of reports to view it. In addition the DG Server needs to be able to manage the Agents application logging functionality. This involves storing and distributing application profiles 260 and the administration of application event filtering by organizational units.

2.2.1 Data Collection and Filtering

The guardian server 150 understands the differences between handling standard high-level user activity data and the application activity data. Application data has a special pivot point called the "Target". All data action events are associated with a Target which is used later to drive the reporting.

The server provides a user interface to specify the filtering of data action event by machine. The filtering configuration is distributed by the server to the agent(s) 200 automatically.

2.2.2 Reports

There are may possible reports that can be provided by the system. Four basic reports are discussed here.

2.2.2.1 Application Access Forensic Report

An example of this report, shown in FIG. 14, lists of all login attempts to the application. The fields displayed are:
Time
Machine
Specific Application
Application User
Windows Logged-on user
Login Success True/False
Any of the fields can be sorted by or filtered on.

2.2.2.2 Data Access Report:

This report consists of a list of all data action events related to a specific Target (a patient in most cases) or performed by a specific user. If we want to report on all data actions related to a specific Target, in the report filter we can specify a specific target and for users we specify "ALL". If we want to know what a user has been doing with target data, we can specify "ALL Targets" and select a user either by it Windows Logon Name or by an Application Username (see FIG. 15 for an example).

Because this report displays data for different forms and applications, the "Form Vector" information is not displayed.

Instead, when the user clicks the "Detail" link the Form Vector field values specific to that form is displayed as shown in FIG. 16.

This list can also be filtered by:
Time period
Machine
Subject/Target
Specific Application
Specific Form
Application User
Windows Logged-on user
Data Action Type 2.2.2.3 Risk Assessment Report Further reports are possible. For example, a risk assessment report summarizes the number of different events (all data action events plus login failures) related to application logging in order to watch trends and assess areas of concern. This is similar to the current high-level event report where data is summarized by user and event counts per type. When a user/event/count combination is clicked the "Data Access Report" for that user is displayed filtered by the particular data action event summarized. This report can be filtered/summarized by:
Time period
Specific Application
Specific Form
Application User
Windows Logged-on user
Data Action Type While this invention has been particularly shown and described with references to preferred embodiments thereof, it will be understood by those skilled in the art that various changes in form and details may be made therein without departing from the scope of the invention encompassed by the appended claims.

What is claimed is:

1. A method for controlling activity in an application process comprising:
   running a profiler process as an autonomous process that is separate from the application process, the profiler process further performing the steps of:
      capturing sets of low-level events with respect to operation of the application profile, the low-level events being performed by an administrative user and corresponding to application-level activities associated with the application process; and
      generating application profiles representing the correspondences of the sets of low-level events to the application-level activities; and
   running an agent process as an autonomous process that is separate from the application process, the agent process further performing the steps of:
      detecting a set of predetermined low-level events related to operation of the application process by a user;
      identifying at least one application profile that represents a correspondence of the set of detected low-level user events to an application- level activity associated with the application process; and
      controlling further permitted application-level activities, according to one or more rules associated with the application profile that corresponds to the detected set of low-level events, without modifying program logic of the application process.

2. A method as in claim 1 additionally comprising:
logging such monitored activity of the application by recording an identifier of the application-level activity.

3. A method as in claim 1 wherein the application profile is stored in a higher level mark-up language.

4. A method as in claim 1 wherein the application process runs in a client/server data processing system.

5. A method as in claim 4 wherein the agent process runs as a kernel process in an operating system within the client.

6. A method as in claim 1 wherein the application process runs in a mainframe/terminal data processing system.

7. A method as in claim 6 wherein the agent process monitors data communications between the mainframe and the terminal.

8. A method as in claim 1 wherein the application process runs in a mainframe emulator/terminal server data processing system.

9. A method as in claim 1 wherein the agent process identifies rules that ensure compliance with specified application data access restrictions.

10. A method as in claim 1 wherein the rules are specified depending upon a class of user of the application process.

11. A method as in claim 1 wherein a profile server stores multiple application profiles; and
the agent process further comprises steps for receiving one or more application profiles from the profile server.

12. A method as in claim 1 wherein the predetermined low-level user events are selected from a group consisting of input field data entry, key strokes, menu selections, and button clicks.

13. A method as in claim 1 wherein the predetermined application-level actions are selected from a group consisting of adding, modifying, or deleting a data record.

14. A method as in claim 1 wherein the predetermined application-level actions are user logins.

15. An apparatus for monitoring activity of an application comprising:
   one or more data processors for running a profiler process and an agent process as autonomous processes that are separate from the application process, the profiler process capturing sets of low-level events with respect to input to the application by an administrative user and generating application profiles representing correspondences of the sets of low-level events to application-level actions associated with the application process: and
   the agent process further comprising:
      a detector, for detecting one or more predetermined low-level events related to user input to the application; and
      a comparator, for comparing the detected low-level events against one or more patterns of such low-level events to determine if an application-level action has occurred, a representation of such patterns of low-level events and corresponding application-level actions and rules provided in an application profile;
      whereby monitoring application-level actions is thus possible without modifying program logic of the application.

16. An apparatus as in claim 15 additionally wherein the agent process further controls at least one subsequent application-level action according to one or more rules associated with the application-level action.

17. An apparatus as in claim 16 wherein the rules specify compliance with application data access restrictions.

18. An apparatus as in claim 16 wherein the rules are specified depending upon a class of user of the application.

19. An apparatus as in claim 15 additionally comprising:
a data logger, for logging such application-level actions thereby detected.

20. An apparatus as in claim 15 wherein the application runs in a client/server data processing system.

21. An apparatus as in claim 20 wherein the agent runs as a kernel process in an operating system within the client.

22. An apparatus as in claim 15 wherein the application runs in a mainframe/terminal data processing system.

23. An apparatus as in claim 22 wherein the agent process monitors communications between the mainframe and the terminal.

24. An apparatus as in claim 15 wherein the application runs in a mainframe emulator/terminal server data processing system.

25. An apparatus as in claim 15 additionally wherein:
a profile server stores application profiles; and the agent receives one or more application profiles from the profile server.

26. An apparatus as in claim 15 wherein the predetermined low-level events are selected from a group consisting of input field data entry, key strokes, menu selections, and button clicks.

27. An apparatus as in claim 15 wherein the predetermined application-level events are selected from a group consisting of data added, data modified, and data deleted.

28. An apparatus as in claim 15 wherein the predetermined application-level actions are user logins.

29. An apparatus as in claim 25 wherein some of the applications run in a client/server environment and other applications run in a mainframe/terminal environment, each application accessing a common application template server.

* * * * *